(12) United States Patent
Heidrich et al.

(10) Patent No.: US 6,167,689 B1
(45) Date of Patent: Jan. 2, 2001

(54) CHAIN LINK FOR AN ENERGY GUIDE CHAIN AND HAVING A COVER WHICH CAN BE PUT INTO TWO DIFFERENT STABLE POSITIONS

(75) Inventors: Klaus Heidrich; Lorenz Klein; Willibald Weber, all of Netphen; Herbert Wehler, Neunkirchen, all of (DE)

(73) Assignee: Kabelschlepp GmbH, Siegen (DE)

( * ) Notice: Under 35 U.S.C. 154(b), the term of this patent shall be extended for 0 days.

(21) Appl. No.: 09/394,768

(22) Filed: Sep. 13, 1999

Related U.S. Application Data (63) Continuation of application No. PCT/EP98/01213, filed on Mar. 4, 1998.

(30) Foreign Application Priority Data

Mar. 13, 1997 (DE) .............................. 197 10 489
Apr. 11, 1997 (DE) .............................. 197 15 170

(51) Int. Cl.[7] .................................................. F16G 13/00
(52) U.S. Cl. ............................... 59/78.1; 59/900; 248/49; 248/75
(58) Field of Search ................................. 59/78.1; 248/49, 248/51, 75

(56) References Cited

U.S. PATENT DOCUMENTS

| | | | |
|---|---|---|---|
| 3,197,954 | * 8/1965 | Merker et al. | .......................... 59/78.1 |
| 3,473,769 | 10/1969 | James . | |
| 4,406,379 | 9/1983 | Anderson . | |
| 4,570,437 | 2/1986 | Moritz . | |
| 5,890,357 | * 4/1999 | Blase | ...................................... 59/78.1 |

FOREIGN PATENT DOCUMENTS

| | | | |
|---|---|---|---|
| 78 00 098 | 5/1978 | (DE) . | |
| 82/3664 | * 11/1982 | (DE) | ...................................... 59/78.1 |
| 33 18 365 | 11/1984 | (DE) . | |
| 88 00 544 | 3/1988 | (DE) . | |
| 43 13 075 | 11/1994 | (DE) . | |
| 44 13 355 | 6/1995 | (DE) . | |
| 0 126 862 | 12/1984 | (EP) . | |

OTHER PUBLICATIONS

G. Erhard, et al., Machinenelemente Aus Theroplastischen Kunststoffen: Band 2. Lager Und Antriebselemente, *VDI–Verlag*, pp. 255–256.

* cited by examiner

*Primary Examiner*—David Jones
(74) *Attorney, Agent, or Firm*—Alston & Bird LLP (57) ABSTRACT

A chain link used in fabricating a flexible energy guide chain for supporting energy conduits from a fixed attachment point to a moveable consuming load. The chain link is composed of two parallel side plates and a base plate interconnecting the side plates so as to form a U-shaped passage for the conduits. A cover is pivotally mounted to one of the side plates by a hinge connection which permits pivotal movement between a first stable position wherein the passage is open and a second stable position wherein the passage is closed. The hinge exerts a spring force which resists movement of the cover from either of its stable positions toward the other stable position.

14 Claims, 5 Drawing Sheets

CHAIN LINK FOR AN ENERGY GUIDE CHAIN AND HAVING A COVER WHICH CAN BE PUT INTO TWO DIFFERENT STABLE POSITIONS

CROSS-REFERENCE TO RELATED APPLICATIONS

This application is a continuation of pending PCT International Application PCT/EP98/01213, filed Mar. 4, 1998, designating inter alia the United States.

BACKGROUND OF THE INVENTION

The present application relates to a chain link used in the fabrication of a flexible energy guide chain for supporting energy conduits, and which has a cover which is moveable between two different stable positions.

To protect energy lines or conduits, in particular supply lines which are laid between a stationary attachment point and a movable consumer load, use is made of flexible guide chains which have a passage which is suitable for receiving the energy lines or conduits. Such chains are fabricated from a plurality of chain links which are hingedly connected together.

The state of the art discloses numerous examples of the design configuration of such energy guide chains. In general terms each chain link has a passage portion which is defined by two spaced-apart, mutually oppositely disposed side walls or plates which are connected by a base wall, and a cover. The cover is hingedly connected to a side plate and extends to the oppositely disposed side plate, when the passage portion is in the closed condition. Such a chain link is known for example from DE 43 13 075 A1 which shows a cover that is releasably connected to a side plate by means of a hinge, and which can be latched to the oppositely disposed side plate. For that purpose the cover has retaining or latching means which co-operate with corresponding retaining or latching means on the side plate. To provide for the pivotal connection of the cover to the side plate, DE 43 13 075 proposes a hinge comprising mounting pins formed on the cover and mounting openings in the side plates for retainingly receiving and guiding the mounting pins. That design configuration for the hinges permits a pivotal movement of the cover through 180°, in which case the cover can be removed in any desired pivotal position.

A further configuration of a chain link is known from DE 33 18 365 C2, wherein two spaced-apart, mutually opposite disposed side plates are connected together by way of a cover. The cover is pivoted to a side plate with a releasable hinge and is lockable to the other side plate by means of an elastic hook. DE 33 18 365 C2 proposes, in regard to the configuration of the hinge connection between the cover and the side plate, that it comprises a hinge axis portion which is formed in an exposed condition in the free edge of the side plate, with the hinge axis portion being of a cross-section which is flattened off perpendicularly to the side plates, and with rounded-off narrow sides, and the hinge further comprises a cut-off, part-circular opening which is formed in the end of the cover and which is provided with portions of an undercut configuration. The advantage of that form of the hinge connection is that, after the cover has been fitted onto the hinge axis portion and after pivotal movement in a direction towards the opposite side plate, the cover is braced to the hinge axis portion in force-locking and positively locking relationship therewith. Such a cover can be pivoted at one side.

DE 44 13 355 C1 discloses a non-releasable hinge connection between a cover and a side plate of a chain link. In regard to the configuration of the non-releasable connection, DE 44 13 355 C1 proposes that the cover be designed with an elongate tongue portion. The side plate is provided with a pin around which the tongue portion is formed and then the tongue is fixed.

The most frequent situation of use of chain link is that in which the cover of each chain link is disposed substantially in a horizontal plane. Such covers are also pivotable through more than 90° so that, in the opened condition, the center of gravity of the cover lies outside the passage portion of the chain link. By this arrangement, the cover is prevented from automatically falling closed, by virtue of the force of gravity acting thereon. In the case of the known design configurations of a chain link however, it is not possible reliably to prevent the cover from falling shut. In particular, by virtue of a limited amount of space for installation of the chain, it is not always possible for the cover to be pivoted sufficiently far. Furthermore, vibration or the like can cause the cover to fall into the shut condition. That results in an increased amount of work, particularly when subsequently laying lines or conduits. There is also a need for a further checking operation to check whether the cover has only fallen shut, or whether it has been put into its predetermined position in the proper fashion.

It is accordingly an object of the present invention to provide a chain link for an energy guide chain in which the cover is not subject to accidental or unintended pivoting.

SUMMARY OF THE INVENTION

The above and other objects and advantages of the present invention are achieved by the provision of a chain link which has a longitudinally extending passage of U-shape in cross section and which is composed of two spaced-apart, parallel side plates, a base wall connected to the side plates, and a cover. The cover is pivotally connected to one of the side plates by a hinge by which the cover can be put into at least two different stable positions. The term stable position is used to denote a position from which the cover can be moved by applying a force so that it is not possible for the cover to pivot accidentally, when a small amount of force is applied to the cover. Preferably the first stable position of the cover is that in which the cover at least partially and preferably entirely exposes or opens the passage of the chain link. The second stable position is the position in which the cover at least partially and preferably entirely closes the passage portion.

In accordance with a further advantageous feature of the invention, the hinge is configured so that the cover can be moved from the one stable position into the other against a spring force. The term "spring force" is to be interpreted in the broadest sense. Spring force in this case also means the force which is necessary to cause elastic deformation of the component parts of the hinge. After elastic deformation, the component parts of the hinge move back into their original configuration.

The hinge preferably has an arm with at least one resilient region. The resilient arm is pivotally connected by its first end to the cover and by its second end to the side plate. The cover is pivotable about a separate hinge axis. In that case the hinge axis is preferably provided on a side plate, and it is positioned to lie between the ends of the resilient arm of the hinge. The hinge is further of such a configuration that the spring force which has to be overcome to move the cover from the one stable position into the other stable position reaches it maximum value when, during the pivotal movement of the cover, the first and second ends of the resilient arm and the hinge axis are on a common straight line. The advantage of this configuration of the hinge is that it gives a snap action. When, during the pivotal movement, the cover has assumed a position in which the spring force has reached its maximum value, then, upon further pivotal movement of the cover, the cover is automatically moved by the resilient arm into the next possible stable position.

The resilient arm can be of a resilient nature overall. However, a preferred embodiment of the resilient arm is one in which the resilient region is formed by a substantially arcuate portion of the arm. The arm can be of an arcuate configuration overall. During the pivotal movement, by virtue of the configuration of the arcuate portion of the arm and the geometrical arrangement of the hinge axis and the pivotal mounting points of the resilient arm on the cover and on the side plate, the arcuate portion deforms into a substantially straight configuration, in the pivotal movement of the cover from the one stable position into the other stable position. In other words, during the pivotal movement, the arcuate portion of the arm is straightened whereby the arm applies a pulling force to the cover. When the force has reached its maximum value during the pivoting movement, the cover snaps into the most closely adjacent stable position.

In accordance with a further advantageous configuration of the resilient arm, it is proposed that two arm parts form a substantially L-shaped arm. The L-shaped configuration of the arm performs the same function as an arcuate configuration of the arm, as referred to above. During a pivotal movement, the L-shaped arm is loaded in such a way that it is virtually bent open. When the cover has reached a position in which the first and second ends of the resilient arm and the hinge axis are on a common straight line, then the L-shaped arm has experienced its maximum degree of being bent open which however is not so great that plastic deformation of the arm occurs, whereby the arm, by virtue of its spring force, moves the cover into the most closely adjacent stable position.

In order for the passage defined by the chain link to be completely exposed by the cover, it is proposed that the cover is connected to the side plate by means of at least one pivotal arm, wherein the pivotal arm is of fixed length and is pivotable about the hinge axis.

In accordance with a further advantageous configuration of the chain link it is proposed that the pivotal arm be composed of two laterally spaced apart parallel arm segments, with the resilient arm positioned between the arm segments.

In order to ensure that energy lines or conduits which are arranged in the passage of a chain link do not open the cover and thus jump out of the passage, it is proposed that the cover can be releasable connected to the oppositely disposed side plate. For that purpose, the cover and the side plate may have connecting means for a releasable connection. The connecting means may be for example in the form of a hook which is provided on the cover, and an opening which is correspondingly provided in the side plate. A preferred embodiment of the connecting means is in the form of retaining or latching elements.

In accordance with the previously known state of the art, a cover is a separate component which possibly, as is known from DE 44 13 355 C1, is non-releasably connected to the side plate by a further production step. The configuration in accordance with the invention of the hinge in conjunction with a pivotal arm, means that the cover with the side plate can be produced in one piece. The entire chain link can also be produced in a single production step. In this respect the chain link is preferably formed of a plastic material. Production of such a chain link may be implemented by injection molding.

In accordance with a further advantageous aspect of the invention, it is proposed that the chain link can be hingedly connected to other like chain links to form a flexible energy guide chain, and so that a continuous passage for an energy line is formed.

BRIEF DESCRIPTION OF DRAWINGS

Further advantages and details of a protective element according to the invention are described with reference to the embodiment illustrated in the drawing in which.

DETAILED DESCRIPTION OF THE PREFERRED EMBODIMENT

Figure 1:
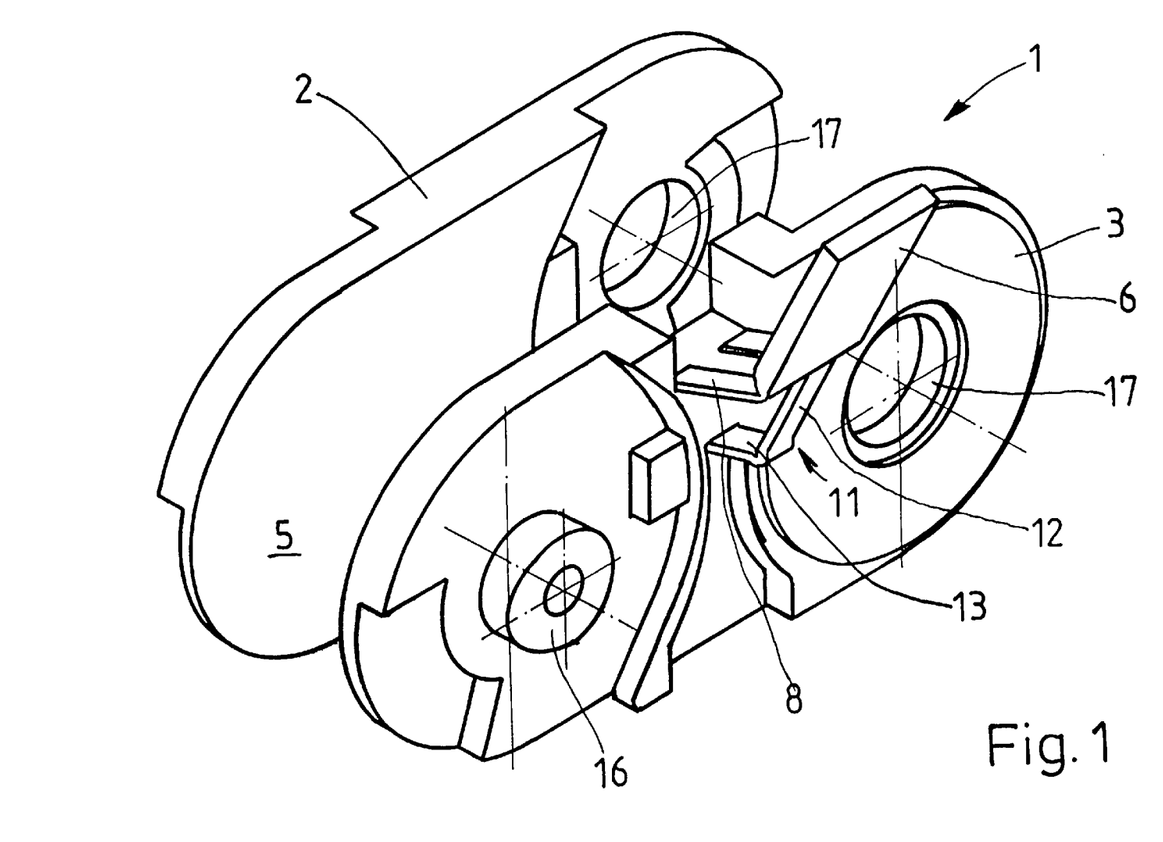
FIG. 1 is a perspective view of a chain link which embodies present invention.

FIG. 1 is a perspective view of an embodiment by way of example of a chain link 1 according to the invention. The chain link 1 has two spaced-apart, mutually oppositely disposed parallel side plates 2, 3. The side plates 2, 3 are connected by a base plate 4, as can be seen from FIG. 2. A cover 6 is pivoted to the side plate 3. The side plates 2, 3, the base plate 4 and the cover 6 define a longitudinally extending passage 5 of generally U-shape in cross section, note FIG. 2.

Figure 2:
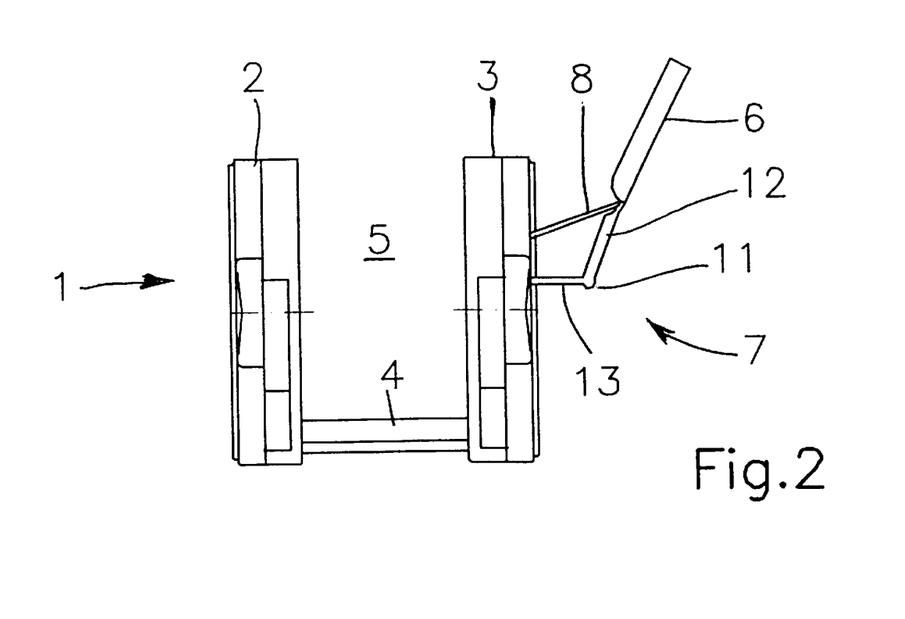
FIG. 2 is front view of the chain link of FIG. 1, with the cover open.
Figure 3:
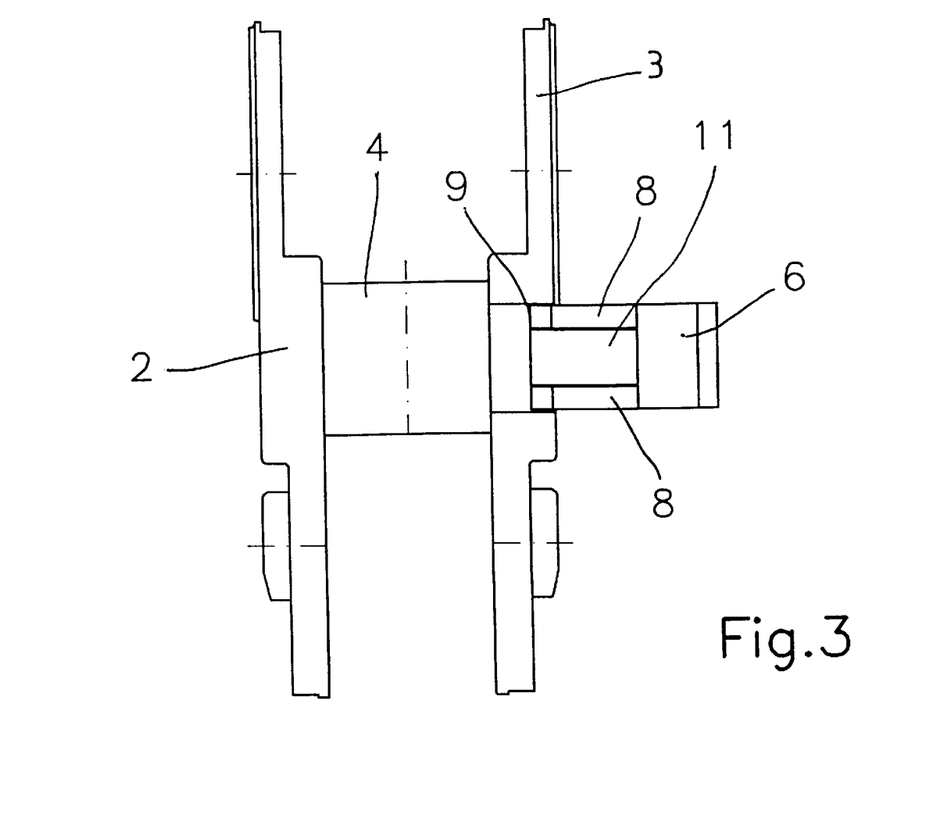
FIG. 3 is a plan view of the chain link of FIG. 1, with the cover open.
Figure 4:
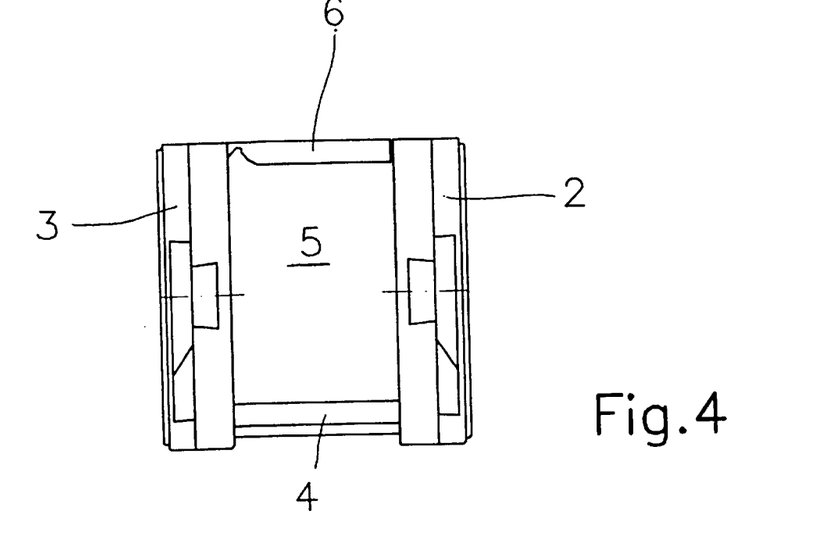
FIG. 4 is a front view of the chain link with the cover closed.
Figure 5:
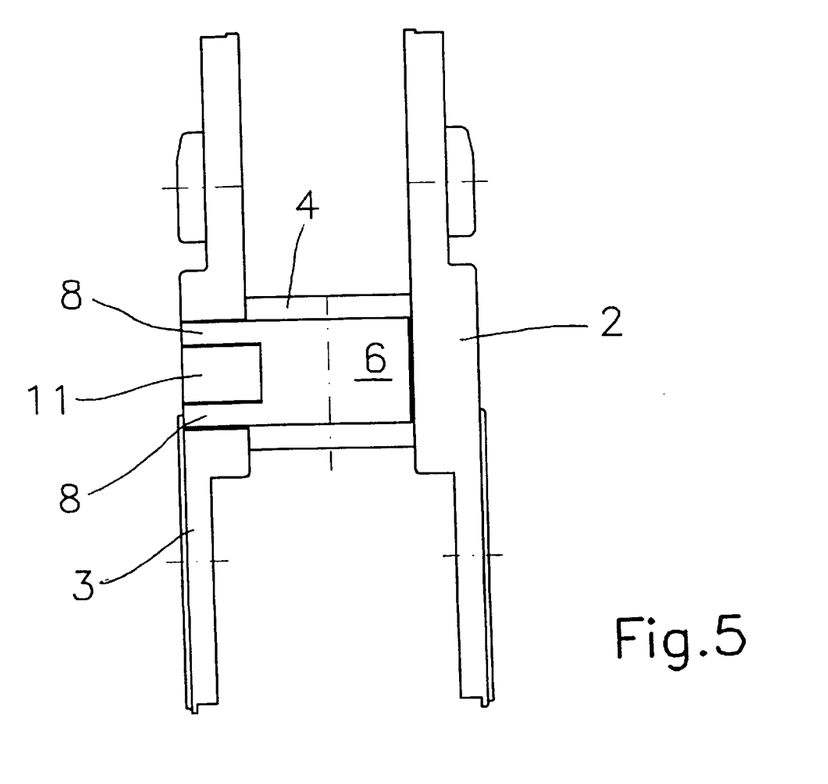
FIG. 5 is a plan view of the chain link with the cover closed.

The cover 6 and the side plate 3 are interconnected by a hinge 7 by means of which the cover 6 can be put into two different stable positions. In FIGS. 1, 2 and 3 the cover 6 has assumed a stable position, with the cover 6 exposing the passage portion 5. The cover 6 can be moved from that stable position into another stable position against a spring force. The further stable position is a position in which the cover 6 extends substantially parallel to the base plate 4, so as to overlie or close the passage, as can be seen for example from FIG. 4.

Figure 6:
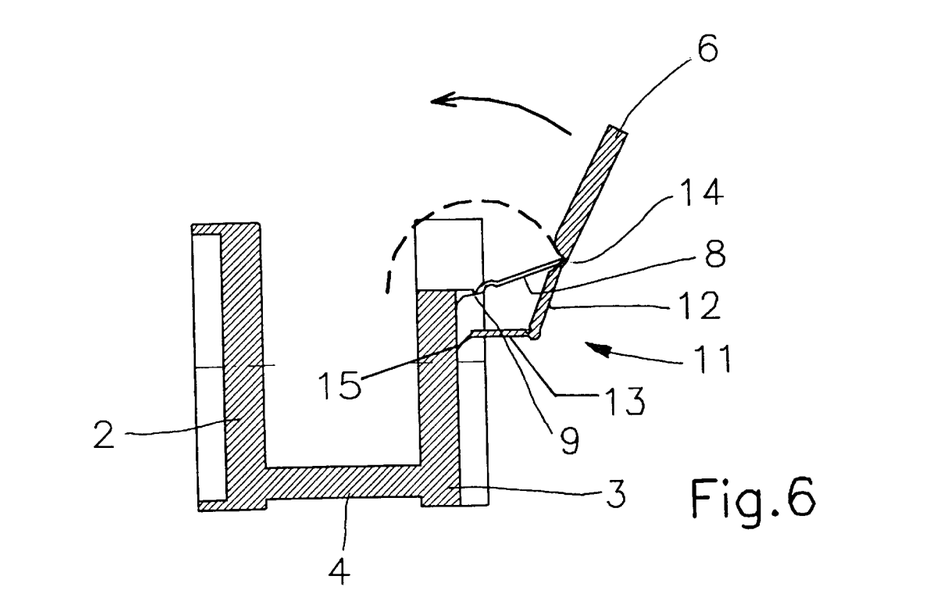
FIG. 6 is a sectional view of the chain link with the cover open.
Figure 7:
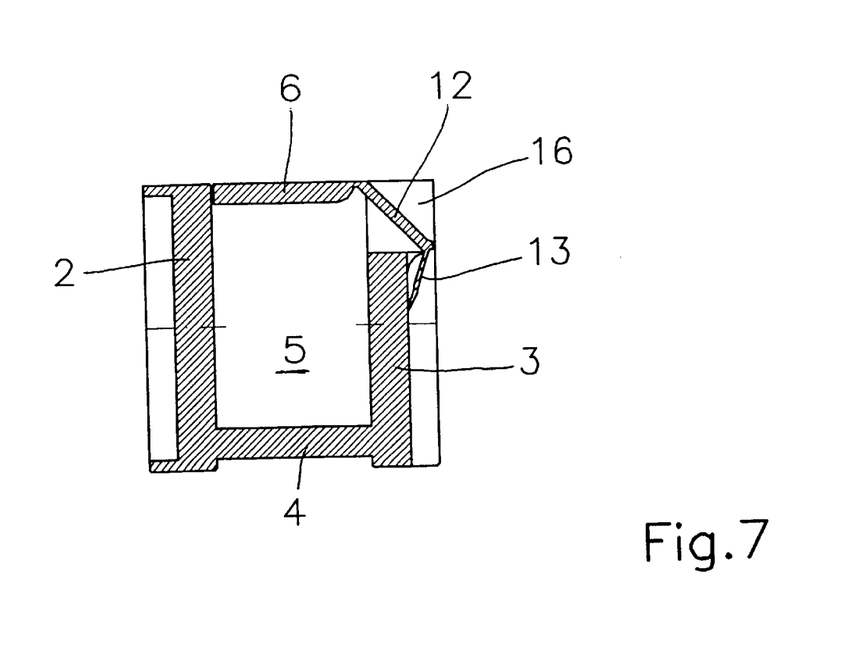
FIG. 7 is a sectional view of the chain link with the cover closed.

The hinge 7 has a substantially resilient arm 11. The arm 11 shown in the embodiment illustrated herein is of a substantially L-shaped configuration. It has an arm part 12 and an arm part 13. The first end of the arm 11 is connected to the cover 6. The second end of the arm 11 is connected to the side plate 3. As can be seen from FIG. 6 in conjunction with FIG. 7, the arm 11 is pivotally connected to both the side plate 3 and the cover 6.

The cover 6 is pivotable about a hinge axis 9. The hinge axis 9 is so arranged that it is between the ends of the arm 11. A pair of spaced apart pivotal arms 8, of fixed length, connect the cover 6 to the side plate 3 so as to be pivotable about the hinge axis 9. The arm 11 is positioned between the two pivotal arms 8 in the illustrated embodiment, note FIG. 3.

During a pivoting movement, the pivotal mounting point 14 at which the pivotal arms 8 are connected to the cover 6 describes a part-circular path about the hinge axis 9, with a radius which corresponds to the length of the pivotal arms 8. During that pivoting movement, the arm 11 which is of an L-shaped configuration is straightened as the distance between the hinge 15 at which the end of the arm part 13 is pivotably mounted to the side plate 3 and the pivotal mounting point 14 to which the end of the arm part 12 is pivotally mounted increases. The L-shaped arm 11 is straightened during the increase in the distance between the pivotal mounting point 14 and the hinge 15. That straightening effect corresponds to the action of "bending open" the L-shaped arm 11, whereby the arm 11 applies a pulling force to the cover 6. The length of the pivotal arms 8 is less than the overall length of the resilient arm 11, and these different lengths are selected so that, during the pivoting movement, the cover assumes a position in which the pivotal mounting point 14, the hinge 15 and the hinge axis 9 lie on a common straight line. In that position, the resilient arm 11 has reached its condition of maximum straightening in which the spring force has also reached a maximum value. When the cover 6 is further pivoted, the resilient arm 11 pulls the cover 6 into a further stable position, wherein the cover 6 extends preferably substantially parallel to the base wall 4, as can be seen in particular from FIG. 7.

In the illustrated embodiment the chain link is made from a plastic material in one piece with the hinge connection. However, that construction is not necessarily to be adopted. The cover 6 and the side plate 3, considered in themselves, can be produced as a one-piece structural unit.

Figure 8:
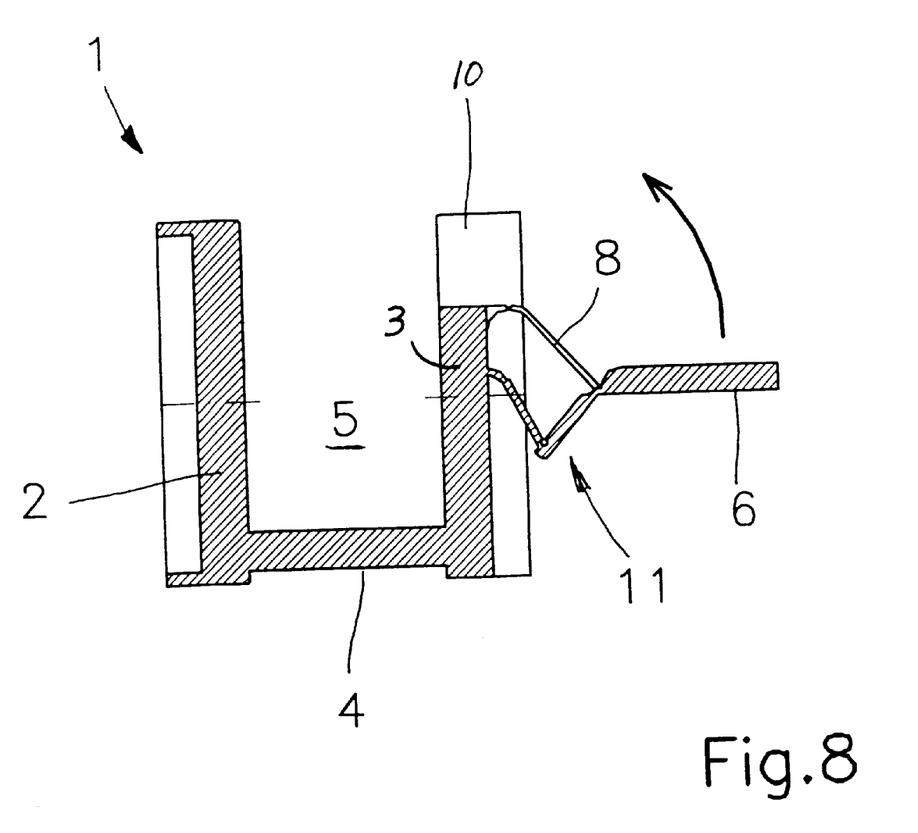
FIG. 8 shows the position of the chain link in an injection molding mold.

FIG. 8 shows the chain link 1 in a position which it occupies in a mold of an injection molding machine. As can be seen from FIG. 8, the cover 6 extends substantially parallel to the base wall 4. The configuration of the resilient arm 11 and of the pivotal arms 8 can be produced by suitable inserts in the mold. Formed in the free end of the side plate 3 is an opening 10 into which the arm part 12 and the pivotal arms 8 project when the cover 6 has reached its closed position.

The chain link according to the invention is preferably of such a design configuration that it can be pivotally connected to further chain links. For pivotally connecting a plurality of chain links, each side plate 2, 3 has in an end region a hinge pin portion 16 and in the opposite end region of a hinge bore 17 which serves to receive a hinge pin portion 16 of an adjacent chain link. Thus the chain links may be serially arranged with adjacent chain links being pivotally connected to each other, to form a flexible chain.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A chain link for an energy guide chain comprising
   two spaced apart parallel side plates and at least one base plate interconnecting the side plates so as to define a longitudinally extending passage of generally U-shape in cross section,
   a cover, and
   a hinge pivotally connecting the cover to one of the side plates for pivotal movement between a first stable position wherein the cover at least partially opens the passage, and a second stable position wherein the cover extends between the side plates so as to at least partially close the passage.

2. The chain link as defined in claim 1 wherein the hinge is configured so as to exert spring force which resists movement of the cover from each of the stable positions toward the other stable position.

3. The chain link as defined in claim 2, wherein the cover has a length sufficient to extend at least substantially the full distance between the side plates.

4. The chain link as defined in claim 2 wherein the hinge comprises
   a resilient arm having one end pivotally connected to the one side plate and the other end pivotally connected to the cover, and
   a pivotal arm of fixed length connecting the cover to said one side plate for pivotal movement about a hinge axis on said one side plate, with the fixed length of the pivotal arm being less than the length of the resilient arm,
   wherein during pivotal movement of the cover between the first and second stable positions, the resilient arm is deformed so as to exert a resisting spring force.

5. The chain link as defined in claim 4 wherein the pivotal arm comprises two laterally spaced apart, parallel arm segments, and wherein the resilient arm is positioned between the arm segments.

6. The chain link as defined in claim 4 wherein the resilient arm is configured so that the resisting force reaches a maximum when, during a pivotal movement of the cover, the two ends of the resilient arm and the hinge axis lie in a common straight line.

7. The chain link as defined in claim 6 wherein the resilient arm includes a resilient substantially arcuate portion.

8. The chain link as defined in claim 6 wherein the resilient arm is of an arcuate configuration over at least substantially its entire length.

9. The chain link as defined in claim 6 wherein the resilient arm is of generally L-shape and comprises two arm parts joined by a resilient arcuate segment.

10. The chain link as defined in claim 1 wherein the two side plates, the base plate, and the cover are each fabricated from a molded plastic material.

11. A chain for supporting energy conduits from an attachment point to a moveable consuming load, comprising a plurality of chain links, with each chain link comprising two spaced apart parallel side plates and at least one base plate interconnecting the side plates so as to define a longitudinally extending passage of generally U-shape in cross section, a cover, and a hinge pivotally connecting the cover to one of the side plates for pivotal movement between a first stable position wherein the cover extends between the side plates so as to at least partially close the passage, and a second stable position wherein the cover at least partially opens the passage,
   said plurality of chain links being serially arranged with adjacent chain links being pivotally connected to each other.

12. The chain as defined in claim 11 wherein the hinge of each chain link is configured so that a spring force resists movement of the cover from each of the stable positions toward the other stable position.

13. The chain as defined in claim 12 wherein the hinge of each chain link comprises
- a resilient arm having one end pivotally connected to the one side plate and the other end pivotally connected to the cover, and
- a pivotal arm of fixed length connecting the cover to said one side plate for pivotal movement about a hinge axis on said one side plate, with the fixed length of the pivotal arm being less than the length of the resilient arm,
- wherein during pivotal movement of the cover of each chain link between the first and second stable positions, the resilient arm is deformed so as to exert a resisting spring force.

14. The chain as defined in claim 13 wherein the resilient arm of each chain link is configured so that the resisting force reaches a maximum when, during a pivotal movement of the cover, the two ends of the resilient arm and the hinge axis lie in a common straight line.

\* \* \* \* \*

UNITED STATES PATENT AND TRADEMARK OFFICE
CERTIFICATE OF CORRECTION

PATENT NO. : 6,167,689 B1
DATED : January 2, 2001
INVENTOR(S) : Heidrich et al.

It is certified that error appears in the above-identified patent and that said Letters Patent is hereby corrected as shown below:

Title Page,
Item [56] References Cited, FOREIGN PATENT DOCUMENTS, line 2, "82/3664" should read -- 82/13664.5 --.

Column 6,
Line 11, after "exert" insert -- a --.

Signed and Sealed this

Ninth Day of October, 2001

Attest:

NICHOLAS P. GODICI
Attesting Officer
Acting Director of the United States Patent and Trademark Office